(12) United States Patent
Kaliavaradhan et al.

(10) Patent No.: US 11,403,306 B2
(45) Date of Patent: *Aug. 2, 2022

(54) SYSTEMS AND METHODS OF SHARING A DATABASE ACROSS MULTIPLE DEPLOYMENTS AND SERVICES

(71) Applicant: Citrix Systems, Inc., Fort Lauderdale, FL (US)

(72) Inventors: Sathishkumar Kaliavaradhan, Pompano Beach, FL (US); Amit Shah, Palm Beach Gardens, FL (US); Steven Keller, Coral Springs, FL (US); Xiaodong Huang, Coral Springs, FL (US); Ayush Jain, North Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/992,584

(22) Filed: Aug. 13, 2020

(65) Prior Publication Data

US 2020/0372022 A1 Nov. 26, 2020

Related U.S. Application Data

(63) Continuation of application No. 15/628,833, filed on Jun. 21, 2017, now Pat. No. 10,776,369.

(51) Int. Cl.
*G06F 16/2458* (2019.01)
*G06F 16/33* (2019.01)
(Continued)

(52) U.S. Cl.
CPC ........ *G06F 16/2465* (2019.01); *G06F 16/278* (2019.01); *G06F 16/28* (2019.01); *G06F 16/33* (2019.01)

(58) Field of Classification Search
CPC .... G06F 16/2465; G06F 16/278; G06F 16/28; G06F 16/33
See application file for complete search history.

(56) References Cited

U.S. PATENT DOCUMENTS 6,609,131 B1 8/2003 Zait et al.
6,772,163 B1 8/2004 Sinclair et al.
(Continued)

OTHER PUBLICATIONS

Michael Stum et al. 'java—How to create a composite Key Field in Apache Solr?' 2012. [retrieved on Mar. 25, 2022]. Stack Overflow [online]. Retrieved from the Internet: <URL:https://stackoverflow.com/questions/9775143/how-to-create-a-composite-key-field-in-apache-solr> (Year: 2012).*

(Continued)

*Primary Examiner* — James E Richardson
(74) *Attorney, Agent, or Firm* — BainwoodHuang

(57) ABSTRACT

Techniques for implementing a non-relational database that makes efficient use of collections within the database. For one or more collections, two or more sub-collections can be created for storing documents. Each collection can be configured as a single partition entity or a partitioned entity within the database. Each sub-collection is identified by a sub-collection identifier. If the collection is configured as a partitioned entity, then a partition key can be determined for documents to be accessed in the collection. The partition key can be extended with the sub-collection ID to form a compound property (sub-collection ID, partition key) that determines placements of the respective documents in the identified sub-collection across partitions of the collection. If the collection is configured as a single partition entity, then a field for the partition key is ignored and the respective documents are placed in the identified sub-collection within the single partition of the collection.

17 Claims, 6 Drawing Sheets

(51) Int. Cl.
  *G06F 16/28* (2019.01)
  *G06F 16/27* (2019.01)

(56) References Cited

U.S. PATENT DOCUMENTS

| | | | |
|---|---|---|---|
| 6,845,375 | B1 | 1/2005 | Sinclair |
| 8,361,028 | B2 | 1/2013 | Gross et al. |
| 9,235,611 | B1 | 1/2016 | Murray et al. |
| 9,633,051 | B1 | 4/2017 | Maccanti et al. |
| 10,025,943 | B1 | 7/2018 | Multani et al. |
| 10,776,369 | B2 | 9/2020 | Kaliavaradhan et al. |
| 2010/0235344 | A1 | 9/2010 | Chandrasekar et al. |
| 2012/0254175 | A1* | 10/2012 | Horowitz ............. G06F 16/278 707/737 |
| 2014/0258255 | A1* | 9/2014 | Merriman ........... G06F 16/1827 707/704 |
| 2017/0091327 | A1 | 3/2017 | Bostic et al. |
| 2017/0103116 | A1 | 4/2017 | Hu et al. |
| 2017/0262638 | A1 | 9/2017 | Horowitz et al. |
| 2017/0308606 | A1 | 10/2017 | Jonsson et al. |
| 2017/0344588 | A1 | 11/2017 | Horowitz et al. |
| 2018/0137144 | A1 | 5/2018 | Geissinger |
| 2018/0314750 | A1 | 11/2018 | Merriman et al. |

OTHER PUBLICATIONS

Granger et al. Solr in Action [online]. Manning Publications. Mar. 2014 [retrieved on Aug. 13, 2019]. Retrieved from the Internet: URL: https://learning.oreilly.com/library/view/solr-in-action/9781617291029/ Chapters 1, 3, 5, 7, 12, 13. (Year 2014).

Potter, Timothy. Introduction to SolrCloud. [online]. ApacheCon. Apr. 7, 2014 [retrieved on Aug. 13, 2019]. Retrieved from the Internet: URL: https://events.static.linuxfound.org/sites/events/files/slides/ApacheCon_IntroSolrCloud.pdf. (Year 2014).

Jeffrey. Massive Technical Interviews Tips: Solr Miscs. [online]. Aug. 13, 2015 [retrieved on Aug. 13, 2019]. Retrieved form the Internet: URL: https://massivetechinterview.blogspot.com/2015/08/solr-miscs.html. (Year 2015).

Gr0. "Solr 4.1: SolrCloud-multiple shards on the same Solr node" [online] Jan. 7, 2013. [retrieved on Nov. 26, 2019]. Retrieved from the Internet: URL:https://solr.pl/en/2013/01/07/solr-4-1-solrcoloud-multiple-shards-on-the-same-solr-node/. (Year 2013).

Rafal Kuc. "Solr Cookbook-Third Edition" [online]. Packt Publishing. Jan. 2015. [retrieved on Nov. 29, 2019]. Retrieved from the Internet: URL:http://learning.oreilly.com/library/view/solr-cookbook-/9781783553150/. Chapter 7 (Year 2015).

Gupta ("Multi level composite-id routing in SolrCloud". Lucidworks [online]. Jan. 6, 2014 [retrieved May 15, 2020]. Retrieved form the Internet: https://lucidworks.com/post/multi-level-composite-id-routing-solrcloud/. (Year 2014).

Lucidworks (Solr Cloud Document Routing. Lucidworks [online]. Jun. 13, 2013 [retrieved May 15, 2020]. Retrieved from the Internet: https://lucidworks.com/post/solr-cloud-document-routing/. (Year 2013).

Whitlatch, Kim, et al., "Introduction to DocumentDB: A NoSQL JSON Database", Ascent Technology, GitHub, Nov. 22, 2016 https://www.ascent.tech/wp-content/uploads/documents/microsoft/documentdb/documentdb.pdf. accessed on Aug. 2, 2018, 611 pages.

* cited by examiner

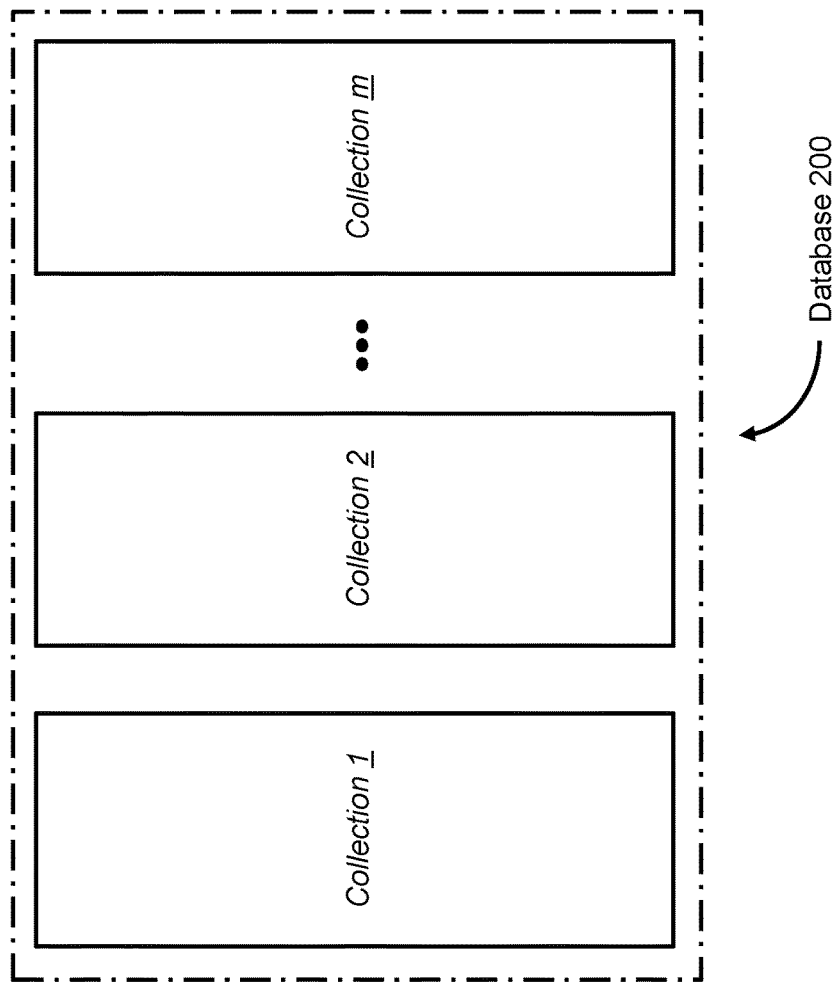
*Fig. 2 – Prior art*
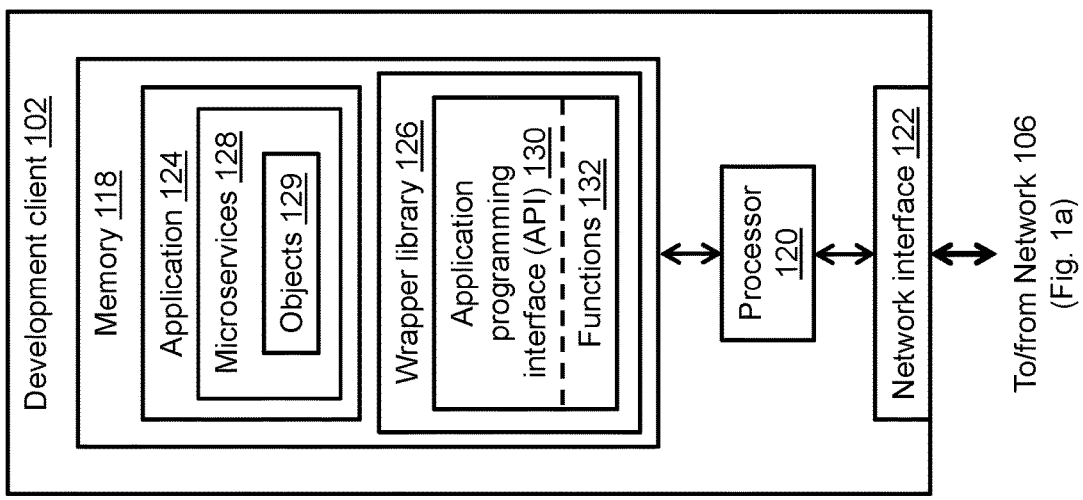
*Fig. 1b*

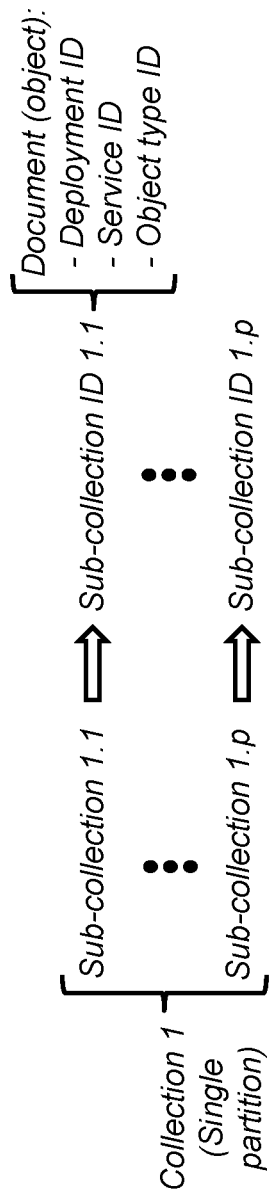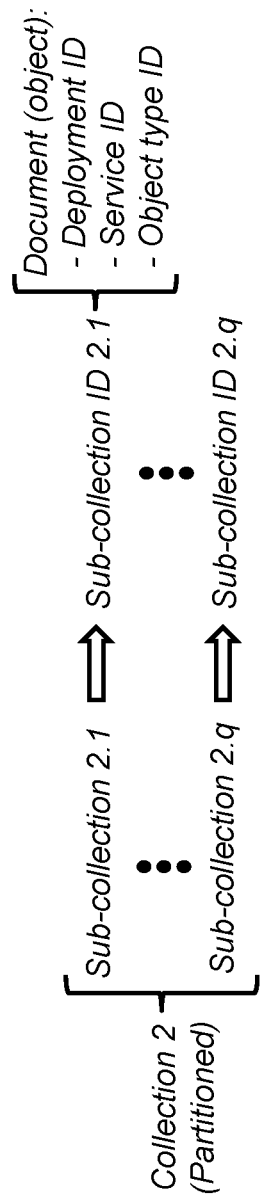
Fig. 3b
Fig. 3c

SYSTEMS AND METHODS OF SHARING A DATABASE ACROSS MULTIPLE DEPLOYMENTS AND SERVICES

CROSS REFERENCE TO RELATED APPLICATIONS

This application is a continuation of U.S. patent application Ser. No. 15/628,833 filed Jun. 21, 2017 entitled SYSTEMS AND METHODS OF SHARING A DATABASE ACROSS MULTIPLE DEPLOYMENTS AND SERVICES.

BACKGROUND

Relational databases are mechanisms for storing and retrieving data based on a relational data model, which generally organizes data into one or more tables of rows and columns. Such relational databases generally employ a fixed schema or structure, which defines the tables and a relationship between the data contained in the tables. Non-relational databases are mechanisms for storing and retrieving data that are modeled other than in the tabular relational form. Such non-relational databases are schema-free (i.e., the data has no fixed schema or structure), and are generally capable of handling large volumes of data with high throughput and low latency relative to relational databases.

SUMMARY

Improved techniques are disclosed herein for implementing a non-relational database that makes more efficient use of collections within the database. For one or more collections, two or more sub-collections can be created for storing documents. Each collection can be configured as a single partition entity or a partitioned entity within the database. Each sub-collection is identified by a sub-collection identifier. If the collection is configured as a partitioned entity, then a partition key can be determined for documents to be stored or otherwise accessed in the collection. The partition key can be extended with the sub-collection ID to form a compound property (sub-collection ID, partition key) that determines placements of the respective documents in the identified sub-collection across multiple partitions of the collection. If the collection is configured as a single partition entity, then a field for the partition key is ignored and the respective documents are placed in the identified sub-collection within the single partition of the collection.

In certain embodiments, a method includes generating a sub-collection of a group of documents within a non-relational database. The sub-collection includes a document from the group. The method further includes receiving a query to access the document. The query includes at least one identifier. The method further includes identifying the sub-collection using the at least one identifier of the query and providing access to the document of the group within the non-relational database in response to identification of the sub-collection.

In certain arrangements, the document has a format that includes at least one document field. The method further includes inserting the at least one identifier into the at least one document field.

In certain arrangements, the method includes providing access to the at least one identifier from the at least one document field.

In certain arrangements, the method includes creating the group of documents as a single partition entity of the non-relational database.

In certain arrangements, the method includes creating the sub-collection of the group within the single partition entity of the non-relational database.

In certain arrangements, the query includes a plurality of query fields containing a plurality of identifiers, respectively. The method further includes identifying the sub-collection using the plurality of identifiers contained in the plurality of query fields, respectively.

In certain arrangements, the method includes obtaining the plurality of identifiers from the plurality of query fields, respectively. The plurality of identifiers includes two or more of a first identifier for a deployment of an application under development, a second identifier for a microservice of the deployment, and a third identifier for a database object type associated with the document.

In certain embodiments, a method includes generating a sub-collection of a group of documents within a non-relational database by partition of the non-relational database. The sub-collection includes a document of the group. The method further includes receiving a query to access the document of the group. The query includes a partition key and the at least one identifier. The method further includes identifying the sub-collection using the at least one identifier and providing access to the document from the identified sub-collection of the non-relational database using the partition key.

In certain arrangements, the document has a format that includes at least a first document field. The method further includes inserting the partition key into the first document field.

In certain arrangements, the format of the document further includes at least one second document field. The method further includes inserting the at least one identifier into the at least one second document field.

In certain arrangements, the method includes obtaining the partition key from the first document field.

In certain arrangements, the method includes obtaining the at least one identifier from the at least one second document field.

In certain arrangements, the query includes a plurality of query fields containing a plurality of identifiers, respectively. The method further includes identifying the sub-collection using the plurality of identifiers contained in the plurality of query fields, respectively.

In certain arrangements, the method includes obtaining the plurality of identifiers from the plurality of query fields, respectively. The plurality of identifiers includes two or more of a first identifier for a deployment of an application under development, a second identifier for a microservice of the deployment, and a third identifier for a database object type associated with the document.

In certain embodiments, a system includes a database server having processing circuitry and a data storage resource. The data storage resource contains a non-relational database. The processing circuitry is configured to generate a sub-collection of a group of documents within the non-relational database. The sub-collection includes a document from the group. The processing circuitry is further configured to receive a query to access the document. The query includes at least one identifier. The processing circuitry is further configured to identify the sub-collection using the at least one identifier of the query and provide access to the document of the group within the non-relational database in response to identification of the sub-collection.

In certain arrangements, the document has a format that includes at least one document field. The processing circuitry is further configured to insert the at least one identifier into the at least one document field.

In certain arrangements, the processing circuitry is configured to provide access to the at least one identifier from the at least one document field.

In certain arrangements, the processing circuitry is configured to create the group of documents as a single partition entity of the non-relational database.

In certain arrangements, the processing circuitry is configured to create the sub-collection of the group within the single partition entity of the non-relational database.

In certain arrangements, the query includes a plurality of query fields containing a plurality of identifiers, respectively. The processing circuitry is further configured to identify the sub-collection using the plurality of identifiers contained in the plurality of query fields, respectively.

Other features, functions, and aspects of the disclosed systems and methods will be evident from the Detailed Description that follows.

BRIEF DESCRIPTION OF THE DRAWINGS

The foregoing and other objects, features, and advantages will be apparent from the following description of particular embodiments of the disclosed systems and methods, as illustrated in the accompanying drawings, in which like reference characters refer to the same parts throughout the different views.

FIG. 1b is a block diagram of an exemplary development client computer that can be employed in the environment of FIG. 1a;

FIG. 2 is a block diagram of a conventional non-relational database that includes multiple collections for storing users' documents or other data;

FIG. 3b illustrates that a single-partition collection within the database of FIG. 3a can include a plurality of sub-collections, the plurality of sub-collections can have a plurality of sub-collection identifiers (IDs), respectively, and each sub-collection ID can include one or more specified IDs;

FIG. 3c illustrates that a partitioned collection within the database of FIG. 3a can include a plurality of sub-collections, the plurality of sub-collections can have a plurality of sub-collection IDs, respectively, each sub-collection ID can include one or more specified IDs, and a partition key for the partitioned collection can be extended to include both a respective sub-collection ID and a partition key that corresponds to a chosen property within the users' documents or other data;

DETAILED DESCRIPTION

The disclosure of U.S. patent application Ser. No. 15/628,833 filed Jun. 21, 2017 entitled SYSTEMS AND METHODS OF SHARING A DATABASE ACROSS MULTIPLE DEPLOYMENTS AND SERVICES is hereby incorporated herein by reference in its entirety.

Improved techniques are disclosed herein for implementing a non-relational database that makes more efficient use of collections within the database. For one or more collections, two or more sub-collections can be created for storing users' documents. Each collection can be configured as a single partition entity or a partitioned entity within the database. Each sub-collection is identified by a sub-collection identifier (ID). If the collection is configured as a partitioned entity, then a partition key can be determined for documents to be stored or otherwise accessed in the collection. The partition key can be extended with the sub-collection ID to form a compound property (sub-collection ID, partition key) that determines placements of the respective documents in the identified sub-collection across multiple partitions of the collection. If the collection is configured as a single partition entity, then a field for the partition key is ignored and the respective documents are placed in the identified sub-collection within the single partition of the collection.

Figure 1A:
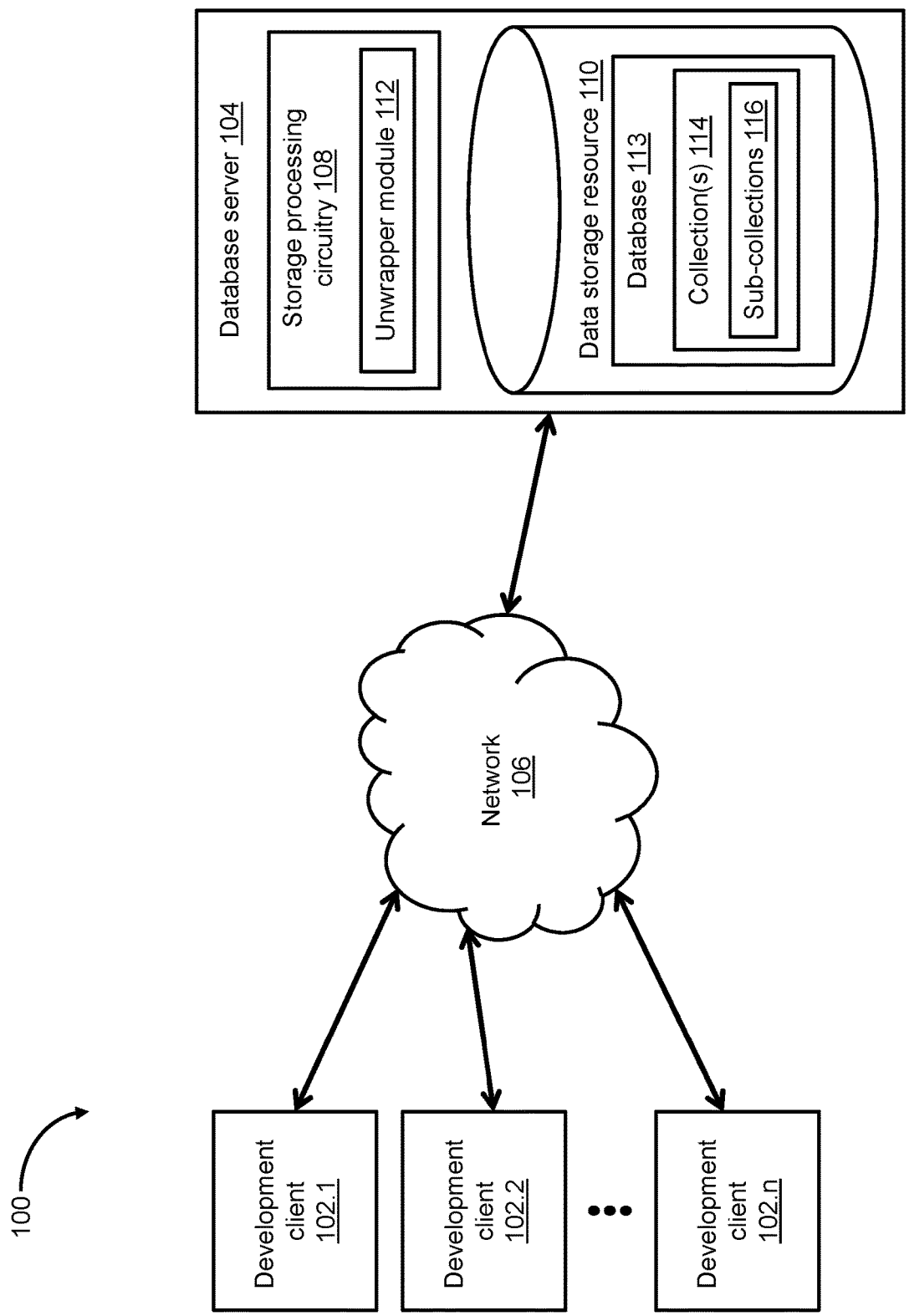
FIG. 1a is a block diagram of a computer program application development environment, in which improved techniques for implementing a non-relational database that makes more efficient use of a limited number of collections within the database can be employed.

FIG. 1a depicts an application development environment (also referred to herein as the "development environment") 100, in which improved techniques for implementing a non-relational database that makes more efficient use of a limited number of collections within the database can be employed. As shown in FIG. 1a, the development environment 100 can include a plurality of application development client computers (also referred to herein as the "development client(s)") 102.1, 102.2, . . . , 102.n communicably coupled to a database server computer (also referred to herein as the "database server") 104 by at least one network 106. The database server 104 can include storage processing circuitry 108, and a data storage resource 110 such as a magnetic disk, a compact disk, an optical disk, a flash drive, a solid state drive (SSD), or any other suitable data storage resource. The database server 104 can host, in the data storage resource 110, at least one database 113, which can be a non-relational database such as DocumentDB (also known as Azure™ Cosmos DB sold by Microsoft Corporation, Redmond, Wash., USA), MongoDB, or any other suitable database.

FIG. 1b depicts an illustrative embodiment of an exemplary development client 102, which can be employed within the development environment 100 of FIG. 1a. It is noted that the development clients 102.1, 102.2, . . . , 102.n of FIG. 1a can each be configured like the development client 102 of FIG. 1b. As shown in FIG. 1b, the development client 102 can include at least one processor 120 operative to execute at least one computer program out of at least one memory 118 for implementing the improved techniques disclosed herein, as well as a network interface 122 for interfacing with the network 106. The memory 118 can accommodate at least one computer program application 124 (also referred to herein as the "application") under development, as well as a wrapper library 126 that can be downloaded to the development client 102 over the network 106.

As further shown in FIG. 1b, the application 124 can have a plurality of microservices 128 associated therewith. Each microservice 128 can correspond to an independent unit of the application 124 that can be created and (possibly) destroyed during the development of the application 124. The microservices 128 can be associated with various types of database objects 129, which can have their own schema or structure. The various types of database objects 129 (e.g., documents or other data) of the respective microservices 128 can be efficiently stored in the database 113 in a way that prevents the documents from being visible to any of the other microservices 128 sharing the database 113. The database 113 can be configured to include a number of collections 114 (see FIG. 1a), each of which can have multiple sub-collections 116 for storing the documents of the respective microservices 128. A plurality of database operations (including create, read, update, and delete (CRUD) operations) for accessing one or more documents in the sub-collections 116 are facilitated by the wrapper library 126. The wrapper library 126 can include a list of predetermined functions 132 (e.g., CRUD functions) associated with an application programming interface (API) 130, a definition of which can be provided to an application developer during development of the application 124. Such predetermined functions of the wrapper library 126 can effectively wrap or encapsulate queries to the database 113, which can be unwrapped or de-encapsulated by an unwrapper module 112 (see FIG. 1a) within the storage processing circuitry 108 of the database server 104.

As described herein, the database 113 hosted by the database server 104 (see FIG. 1a) can be configured to include a number of collections 114 for storing documents of the microservices 128 of the application 124 (see FIG. 1b) under development. FIG. 2 depicts a representation of a number of conventional collections 1, 2, . . . , m that can be included in a database 200 hosted by a suitable database server. In a known non-relational database, such as DocumentDB, one or more partitioned (or single partition) collections, like the collections 1, 2, . . . , m, can be created for storing one or more database objects, such as documents or other data. A "partition" is defined herein as a physical storage node of a data storage resource that can host or store such documents or other data. Each partition of a partitioned collection can host one or more values of a partition key, which corresponds to a chosen property within one or more documents that determines placements of the documents across multiple partitions of the collection. When a document is added to the partitioned collection, the partition key is retrieved from the document, a value of the partition key is determined (e.g., using any suitable hash function or digital signature), and the document is grouped together into a logical shard (also known as a "horizontal partition") with any other document(s) having the same value of the partition key and placed in the partition hosting that value of the partition key. If a collection is configured as a single partition collection, then all documents are placed in the single partition of the collection.

There are drawbacks to known non-relational databases, in which collections like the conventional collections 1, 2, . . . , m of FIG. 2 can be created. For example, the maximum total number of such collections that can be created within the database 200 is typically limited. This can be problematic for application developers who may have the task of developing applications that require multiple deployments, each of which can include a number of microservices that can exceed the maximum total number of collections within the database. In a distributed computing environment, such deployments of applications can have hundreds, if not thousands, of microservices, each of which can require a share of the database, but may not want its data to be visible to any of the other microservices sharing the same database. Further, each microservice can be associated with a certain type of database object, which can have its own schema or structure for data. Such a scenario may dictate that each microservice of an application under development have its own collection within a database. However, because the maximum total number of collections within the database is limited, multiple databases may be required to support the many microservices of the application. Moreover, because application developers are typically charged for such databases on a per collection basis, the costs involved for developing applications with many microservices can quickly become prohibitive.

Figure 3A:
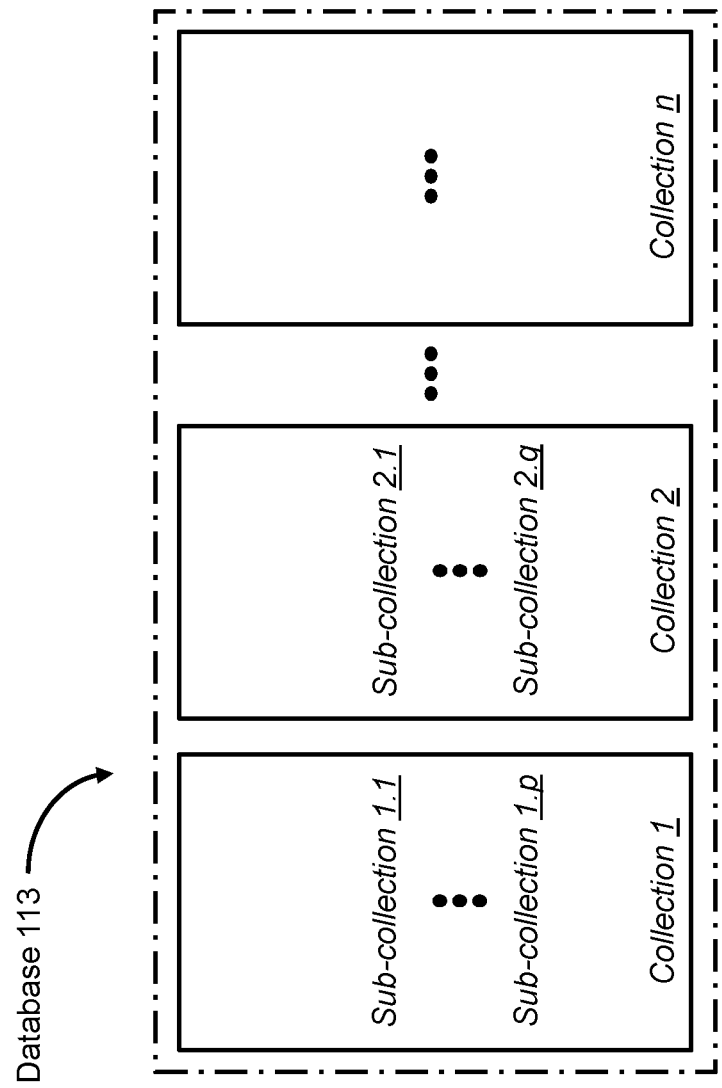
FIG. 3a is a block diagram of an exemplary non-relational database that can be implemented within the environment of FIG. 1a, in which the database includes multiple collections, and one or more of the multiple collections can include a plurality of sub-collections for storing users' documents or data.

At least some of the drawbacks of such known non-relational databases can be avoided by creating a plurality of sub-collections within one or more collections of a database. FIG. 3a depicts an exemplary representation of an illustrative embodiment of a number of collections 1, 2, . . . , n, which can be included in the database 113 hosted by the database server 104 (see FIG. 1a). The collections 1, 2, . . . , n can be remotely (or locally) created on the database server 104 by an application developer using the development client 102 (see FIG. 1b). Each of the collections 1, 2, . . . , n can have zero, one, two, or more than two sub-collections for storing documents of the respective microservices 128. For example, Collection 1 (see FIG. 3a) can have two or more sub-collections 1.1, . . . , 1.p, and Collection 2 (see also FIG. 3a) can have two or more sub-collections 2.1, . . . , 2.q.

Such creation and use of multiple sub-collections within collections of a database, such as Collection 1 and Collection 2 of FIG. 3a, will be further understood with reference to the following illustrative example. In this example, each of the collections 1, 2, . . . , n corresponds to one of the collections 114 (see FIG. 1a) created for the database 113 within the data storage resource 110 of the database server 104. For example, using the development client 102, the application developer can create Collection 1 as a single partition entity within the database 113, and create Collection 2 as a partitioned entity within the database 113. Further, the sub-collections 1.1, . . . , 1.p of Collection 1, as well as the sub-collections 2.1, . . . , 2.q of Collection 2, correspond to at least some of the sub-collections 116 (see FIG. 1a) within the collection 114.

Having created Collection 1 (see FIG. 3a) within the database 113 as a single partition entity, the application developer can create, update, store, or otherwise access, within the single partition of Collection 1, one or more database objects 129 (see FIG. 1b) (e.g., documents or other data) of one or more microservices 128 of the application 124 under development. In this example, each of the documents to be created, updated, stored, or otherwise accessed in Collection 1 is associated with a specified deployment of the application 124, a specified microservice among the microservices 128, and a specified type of database object. For example, the specified deployment may be a "staging" deployment, the specified microservice may be a "customer information unit" of the application 124, and the specified database object type may be "customer." Further, each document can have a format that includes a first field for an object ID (objectId), as well as one or more second fields for certain auxiliary data (e.g., a customer's first name (first-Name), last name (lastName), age, etc.), as follows:

```
{
    objectId: "document_1",
    firstName: "William",
    lastName: "Smith",
    age: "27"
}.
```

It is noted that the application developer can download the wrapper library 126 to the development client 102 for use in providing CRUD queries to the database 113 for documents of the specified microservice. For example, the wrapper library 126 can be associated with the API 130, and a definition of the wrapper API 130 can be provided to the application developer via the development client 102.

Using the development client 102, the application developer can generate a "create" or "update" query for a document of the specified microservice (i.e., customer information unit) within the database 113. Such a create/update query can be generated as an API call to the create/update function of the wrapper library 126, which effectively wraps or encapsulates the create/update query to enable the database server 104 to create, update, store, or otherwise access the document in the single partition of Collection 1 (see FIG. 3*a*). In response to the API call to the create/update function of the wrapper library 126, an identifier (ID) for a sub-collection (e.g., Sub-collection 1.1; see FIG. 3*a*) is generated for the respective document. In this example, the ID for Sub-collection 1.1 (i.e., Sub-collection ID 1.1; see FIG. 3*b*) can include a plurality of identifiers (IDs) generated for the specified deployment (i.e., staging), the specified microservice (i.e., customer information unit), and the specified database object type (i.e., customer). For purposes of illustration, FIG. 3*b* shows that the single partition collection, i.e., Collection 1, can include the two or more sub-collections 1.1, . . . , 1.*p*, and that the two or more sub-collections 1.1, . . . , 1.*p* can have two or more sub-collection IDs 1.1, . . . , 1.*p*, respectively. FIG. 3*b* further shows, with reference to Sub-collection ID 1.1, that each respective sub-collection ID 1.1, . . . , 1.*p* can include a specified deployment ID (Deployment ID), a specified microservice ID (Service ID), and a specified database object type ID (Object type ID), each of which is associated with the document of the specified microservice (i.e., customer information unit).

In further response to the API call to the create/update function of the wrapper library 126, the format of the document is modified to include a first field for the Deployment ID (deploymentId), a second field for the Service ID (serviceId), a third field for the Object type ID (objectTypeId), a fourth field for the object ID (objectId), as well as one or more fifth fields for the auxiliary data (i.e., the customer's first name (firstName), last name (lastName), age, etc.), as follows:

```
{
    deploymentId: "staging_123",
    serviceId: "customer_information_unit_123",
    objectTypeId: "customer_123",
    objectId: "document_1",
    firstName: "William",
    lastName: "Smith",
    age: "27"
}.
```

Upon receipt of the wrapped or encapsulated create/update query at the database server 104, the unwrapper module 112 unwraps or de-encapsulates the create/update query to obtain the plurality of identifiers included in Sub-collection ID 1.1, namely, the Deployment ID (deploymentId), the Service ID (serviceId), and the Object type ID (objectTypeId). The document is then placed, stored, or otherwise accessed in Sub-collection 1.1 within the single partition of Collection 1.

Accordingly, with reference to Collection 1 (see FIG. 3*a*) of the database 113, documents having the same sub-collection ID (e.g., the same Deployment ID, the same Service ID, and the same Object type ID) can be placed, stored, or otherwise accessed in the same sub-collection 1.1, . . . , or 1.*p* of Collection 1. Further, documents having different sub-collection IDs (e.g., one or more different Deployment IDs, Service IDs, or Object type IDs) can be placed, stored, or otherwise accessed, as well as isolated from one another, in different sub-collections 1.1, . . . , 1.*p* of Collection 1.

With further reference to Collection 1 (see FIG. 3*a*) of the database 113, the application developer can also generate a read query for a document of the specified microservice stored within the database 113. Such a read query can be generated at the development client 102 as an API call to a read function of the wrapper library 126. Such a read query can be expressed, as follows:

"Select * from customers where age>25."

The read function of the wrapper library 126 effectively wraps or encapsulates the read query to enable the database server 104 to read one or more documents from a sub-collection (e.g., Sub-collection 1.1; see FIG. 3*a*) of Collection 1. In response to the API call to the read function of the wrapper library 126, one or more fields indicating the identifier for Sub-collection 1.1 (i.e., Sub-collection ID 1.1; see FIG. 3*b*), namely, a first field for the Deployment ID (deploymentId), a second field for the Service ID (serviceId), and a third field for the Object type ID (objectTypeId), are incorporated into the read query, as follows:

```
"Select * from customers where age > 25 and
    deploymentId: "staging_123",
    serviceId: "customer_information_unit_123",
    objectTypeId: "customer_123"."
```

Upon receipt of the wrapped or encapsulated read query at the database server 104, the unwrapper module 112 unwraps or de-encapsulates the read query to obtain the plurality of identifiers included in Sub-collection ID 1.1, namely, the Deployment ID (deploymentId), the Service ID (serviceId), and the Object type ID (objectTypeId). One or more documents where the customer age in the auxiliary data is indicated as being greater than 25 are then read from Sub-collection 1.1 within the single partition of Collection 1.

With further regard to this illustrative example, having created Collection 2 (see FIG. 3*a*) of the database 113 as a partitioned entity, the application developer can create, update, store, or otherwise access within multiple partitions of Collection 2, one or more database objects 129 (e.g., documents or data) of one or more microservices 128 of the application 124 under development. As described herein with reference to Collection 1, each of the documents to be created, updated, stored, or otherwise accessed in Collection 2 can be associated with a specified deployment of the application 124, a specified microservice among the microservices 128, and a specified type of database object. For example, the specified deployment may be a "production" deployment, the specified microservice may be a "customer billing unit" of the application 124, and the specified database object type may be "billing." Further, the application developer can determine a partition key for the documents to be stored in Collection 2. For example, the partition key can correspond to a chosen property within the documents of the specified microservice, such as "city" or any other suitable chosen property. In addition, each document can have a format that includes a first field for the partition key of the object (partitionKey_of_object), a second field for an object ID (objectId), as well as one or more third fields for certain auxiliary data (e.g., a customer's first name (firstName), last name (lastName), billing period (billingPeriod), etc.), as follows:

```
{
    partitionKey_of_object: "Boston",
    objectId: "document_2",
    firstName: "Charlie",
    lastName: "Harrington",
    billingPeriod: "31-60 days"
}.
```

Using the development client 102, the application developer can generate a "create" or "update" query for a document of the specified microservice within the database 113. Such a create/update query can be generated as an API call to the create/update function of the wrapper library 126, which effectively wraps or encapsulates the create/update query to enable the database server 104 to create, update, store, or otherwise access the document in a partition of Collection 2 (see FIG. 3a). In response to the API call to the create/update function of the wrapper library 126, an extended partition key (Partition key) is generated as a string that includes an identifier (ID) for a sub-collection (e.g., Sub-collection 2.1; see FIG. 3a) and the partition key of the object (partitionKey_of_object). Further, the ID for Sub-collection 2.1 (i.e., Sub-collection ID 2.1; see FIG. 3c) is generated for the respective document that includes a specified deployment ID (Deployment ID), a specified microservice ID (Service ID), and a specified database object type ID (Object type ID). In this example, Sub-collection ID 2.1 can include a plurality of identifiers (IDs) generated for the specified deployment (i.e., production), the specified microservice (i.e., customer billing unit), and the specified database object type (i.e., billing). For purposes of illustration, FIG. 3c shows that the partitioned collection, i.e., Collection 2, can include the two or more sub-collections 2.1, ..., 2.q, and that the two or more sub-collections 2.1, ..., 2.q can have two or more sub-collection IDs 2.1, ..., 2.q, respectively. FIG. 3c further shows, with reference to Sub-collection ID 2.1, that each respective sub-collection ID 2.1, ..., 2.q can include a specified deployment ID (Deployment ID), a specified microservice ID (Service ID), and a specified database object type ID (Object type ID), each of which is associated with the document of the specified microservice (i.e., customer billing unit). In addition, FIG. 3c shows that the extended partition key can be generated as the string that includes Sub-collection ID 2.1 and the partition key of the object.

In further response to the API call to the create/update function of the wrapper library 126, the format of the document is modified to include a first field for the extended partition key (partitionKey), a second field for the Deployment ID (deploymentId), a third field for the Service ID (serviceId), a fourth field for the Object type ID (objectTypeId), a fifth field for the partition key of the object (partitionKey_of_object), a sixth field for the object ID (objectId), as well as one or more seventh fields for the auxiliary data (e.g., the customer's first name (firstName), last name (lastName), billing period (billingPeriod), etc.), as follows:

```
{
    partitionKey:
    [deploymentId]:[serviceId]:[objectTypeId]:[partitionKey_of_object]
    deploymentId: "production_123",
    serviceId: "customer_billing_unit_123",
    objectTypeId: "billing_123",
    partitionKey_of_object: "Boston",
    objectId: "document_2",
    firstName: "Charlie",
    lastName: "Harrington",
    billingPeriod: "31-60 days"
},
``` in which "partitionKey" is a string that includes the Deployment ID (i.e., production_123), the Service ID (i.e., customer_billing_unit_123), the Object type ID (i.e., billing_123), and the partition key of the object (i.e., Boston).

Upon receipt of the wrapped or encapsulated create/update query at the database server 104, the unwrapper module 112 unwraps or de-encapsulates the create/update query to obtain the plurality of identifiers included in Sub-collection ID 2.1, namely, the Deployment ID (deploymentId), the Service ID (serviceId), and the Object type ID (objectTypeId), as well as the extended partition key (i.e., the string that includes the Deployment ID, the Service ID, the Object type ID, and the partition key of the object). Further, a value of the extended partition key is determined (e.g., using any suitable hash function or digital signature), and the document is placed, stored, or otherwise accessed in Sub-collection 2.1 within the partition of Collection 2 that hosts the value of the extended partition key.

Accordingly, with reference to Collection 2 (see FIG. 3a) of the database 113, documents having the same sub-collection ID (e.g., the same Deployment ID, the same Service ID, and the same Object type ID) can be placed, stored, or otherwise accessed in the same sub-collection 2.1, ..., or 2.q of Collection 2. Further, documents having both the same sub-collection ID and the same extended partition key can be placed, stored, or otherwise accessed in the same sub-collection 2.1, ..., or 2.q of Collection 2, as well as the same partition of Collection 2 that hosts the value of the extended partition key. In addition, documents having different sub-collection IDs and/or different extended partition keys (e.g., one or more different Deployment IDs, Service IDs, Object type IDs, or partition keys of the object) can be placed, stored, or otherwise accessed, as well as isolated from one another, in different sub-collections 2.1, ..., 2.q of Collection 2 and/or different partitions of Collection 2.

With further reference to Collection 2 (see FIG. 3a) of the database 113, the application developer can also generate a read query for a document of the specified microservice stored within the database 113. Such a read query can be generated at the development client 102 as an API call to a read function of the wrapper library 126. Such a read query can be expressed, as follows:

"Select * from billings where billing period>30 days."

The read function of the wrapper library 126 effectively wraps or encapsulates the read query to enable the database server 104 to read one or more documents from a sub-collection (e.g., Sub-collection 2.1; see FIG. 3*a*) of Collection 2. In response to the API call to the read function of the wrapper library 126, one or more fields indicating an identifier for Sub-collection 2.1 (i.e., Sub-collection ID 2.1; see FIG. 3*c*), namely, a first field for the Deployment ID (deploymentId), a second field for the Service ID (serviceId), and a third field for the Object type ID (objectTypeId), are incorporated into the read query, as follows:

---

"Select * from billings where billing period > 30 days" and
deploymentId: "production_123",
serviceId: "customer_billing_unit_123",
objectTypeId: "billing_123".

---

Upon receipt of the wrapped or encapsulated read query at the database server 104, the unwrapper module 112 unwraps or de-encapsulates the read query to obtain the plurality of identifiers included in Sub-collection ID 2.1, namely, the Deployment ID (deploymentId), the Service ID (serviceId), and the Object type ID (objectTypeId). One or more documents where the billing period is greater than 30 days are then read from Sub-collection 2.1 across the multiple partitions of Collection 2.

Figure 4A:
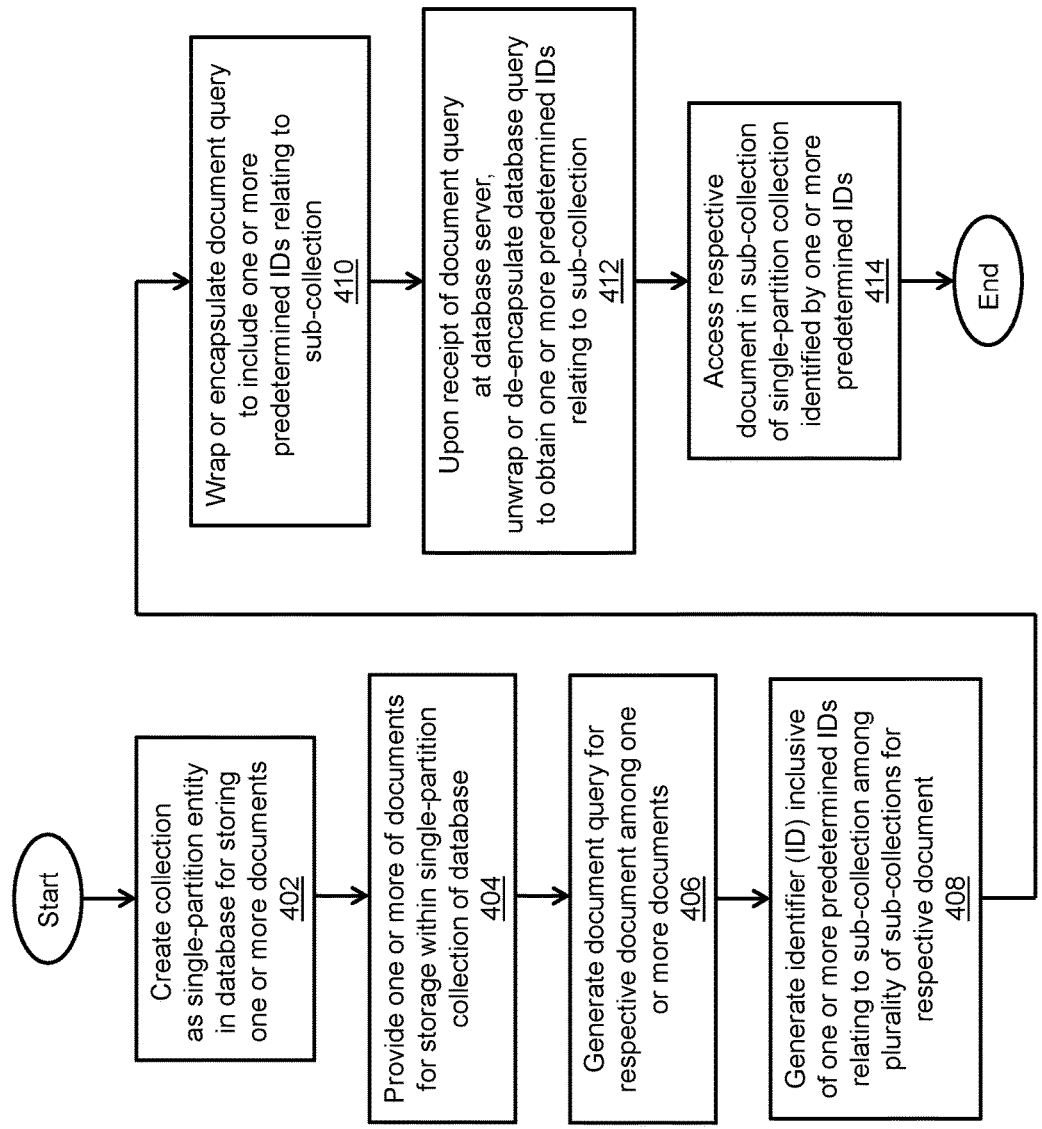
FIG. 4a is a flow diagram of an exemplary method of implementing a non-relational database that makes more efficient use of a limited number of collections within a database storage resource, using at least one collection configured as a single-partition entity and including a plurality of sub-collections.

A method of implementing a non-relational database that makes more efficient use of a limited number of collections within a database storage resource, using at least one collection configured as a single-partition entity and including a plurality of sub-collections, is described below with reference to FIG. 4*a*. As depicted in block 402, a collection is created as a single-partition entity in the database for storing one or more documents. As depicted in block 404, one or more of the documents are provided for storage within the single-partition collection of the database. As depicted in block 406, a document query is generated for a respective document among the one or more documents. As depicted in block 408, an identifier (ID) inclusive of one or more predetermined IDs relating to a sub-collection among the plurality of sub-collections is generated for the respective document. As depicted in block 410, the document query is wrapped or encapsulated to include the one or more predetermined IDs relating to the sub-collection. As depicted in block 412, upon receipt of the document query at a database server, the database query is unwrapped or de-encapsulated to obtain the one or more predetermined IDs relating to the sub-collection. As depicted in block 414, the respective document is accessed in the sub-collection of the single-partition collection identified by the one or more predetermined IDs.

Figure 4B:
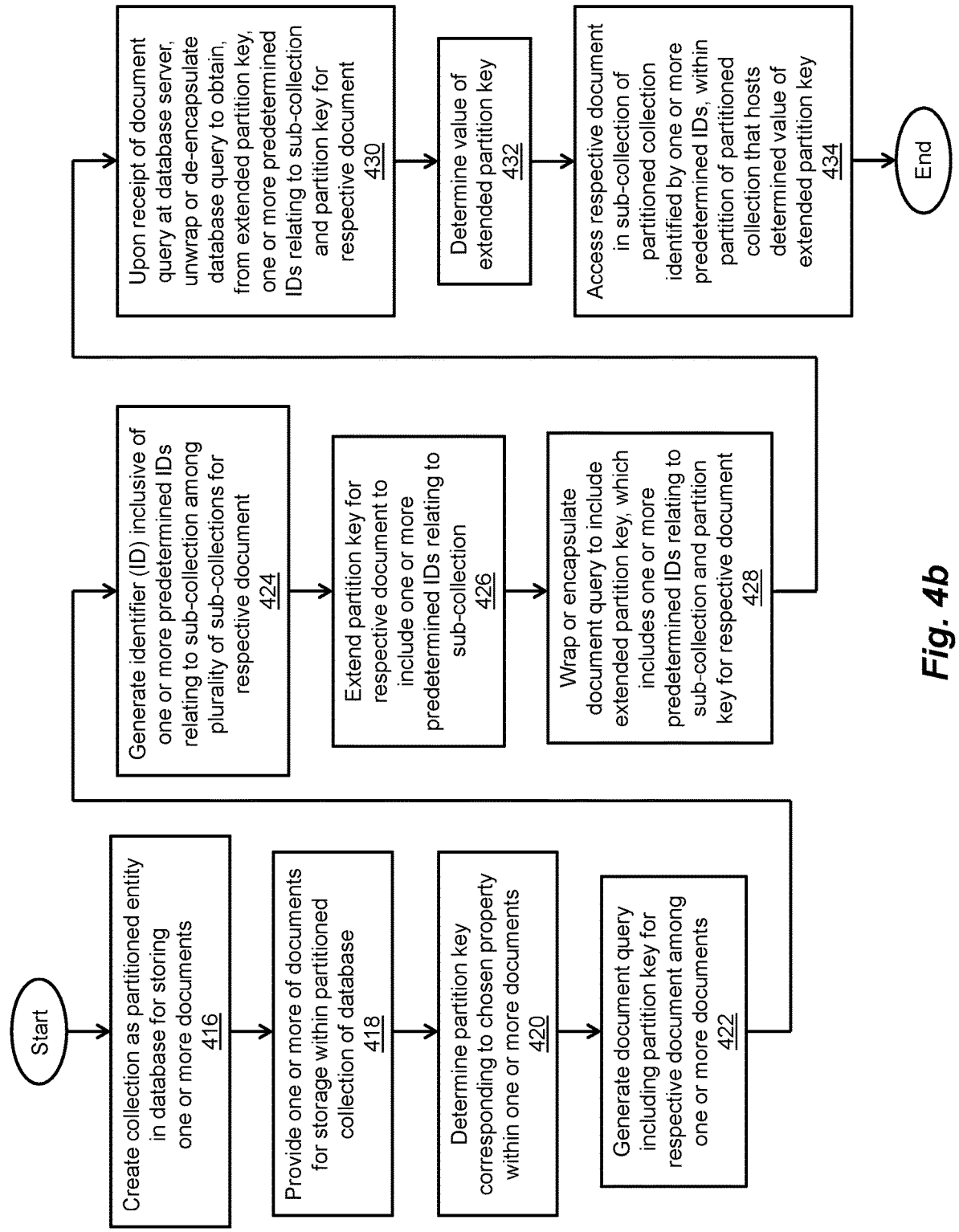
FIG. 4b is a flow diagram of an exemplary method of implementing a non-relational database that makes more efficient use of a limited number of collections within a database storage resource, using at least one collection configured as a partitioned entity and including a plurality of sub-collections.

Another method of implementing a non-relational database that makes more efficient use of a limited number of collections within a database storage resource, using at least one collection configured as a partitioned entity and including a plurality of sub-collections, is described below with reference to FIG. 4*b*. As depicted in block 416, a collection is created as a partitioned entity in the database for storing one or more documents. As depicted in block 418, one or more of the documents are provided for storage within the partitioned collection of the database. As depicted in block 420, a partition key is determined corresponding to a chosen property within the one or more documents. As depicted in block 422, a document query including the partition key is generated for a respective document among the one or more documents. As depicted in block 424, an identifier (ID) inclusive of one or more predetermined IDs relating to a sub-collection among the plurality of sub-collections is generated for the respective document. As depicted in block 426, the partition key for the respective document is extended to include the one or more predetermined IDs relating to the sub-collection. As depicted in block 428, the document query is wrapped or encapsulated to include the extended partition key, which, in turn, includes the one or more predetermined IDs relating to the sub-collection and the partition key for the respective document. As depicted in block 430, upon receipt of the document query at a database server, the database query is unwrapped or de-encapsulated to obtain, from the extended partition key, the one or more predetermined IDs relating to the sub-collection and the partition key for the respective document. As depicted in block 432, a value of the extended partition key is determined, using, for example, any suitable hash function or digital signature. As depicted in block 434, the respective document is accessed in the sub-collection of the partitioned collection identified by the one or more predetermined IDs, within a partition of the partitioned collection that hosts the determined value of the extended partition key.

Although features are shown and described herein with reference to particular illustrative embodiments hereof, such features may be included and hereby are included in any of the disclosed embodiments and their variants. Thus, it is understood that features disclosed in connection with any embodiment are included as variants of any other embodiment. Further, the improvement or portions thereof may be embodied as a computer program product including one or more non-transient, computer-readable storage media, such as a magnetic disk, magnetic tape, compact disk, DVD, optical disk, flash drive, solid state drive (SSD), Secure Digital (SD) chip or device, Application Specific Integrated Circuit (ASIC), Field Programmable Gate Array (FPGA), and/or the like. Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, acts, elements, or aspects of something in an open-ended fashion. Also, as used herein and unless a specific statement is made to the contrary, the word "set" or "subset" means one or more of something. This is the case regardless of whether the phrase "set of" or "subset of" is followed by a singular or plural object, and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. Although certain embodiments are disclosed herein, it is understood that these are provided by way of example only, and that the disclosed systems and methods are not limited to these particular embodiments.

While various embodiments of the disclosed systems and methods have been particularly shown and described, it will be understood by those skilled in the art that various changes in form and details may be made therein without departing from the scope of the disclosed systems and methods, as defined by the appended claims.

What is claimed is:

1. A method comprising:
generating a sub-collection of a group of documents within a non-relational database, the sub-collection including a document from the group, the sub-collection having a sub-collection identifier (ID) including a plurality of identifiers;
receiving a query to access the document, the query including a plurality of query fields containing the plurality of identifiers, respectively;
identifying the sub-collection using the plurality of identifiers contained in the plurality of query fields, respectively; and
providing access to the document of the group within the non-relational database in response to identification of the sub-collection.

2. The method of claim 1 wherein the document has a format that includes a plurality of document fields, and wherein the method further comprises:
inserting the plurality of identifiers into the plurality of document fields, respectively.

3. The method of claim 2 further comprising:
providing access to the plurality of identifiers from the plurality of document fields, respectively.

4. The method of claim 1 further comprising:
creating the group of documents as a single partition entity of the non-relational database.

5. The method of claim 4 further comprising:
creating the sub-collection of the group within the single partition entity of the non-relational database.

6. The method of claim 1 wherein the identifying of the sub-collection includes obtaining the plurality of identifiers from the plurality of query fields, respectively, the plurality of identifiers including two or more of a first identifier for a deployment of an application under development, a second identifier for a microservice of the deployment, and a third identifier for a database object type associated with the document.

7. A method comprising:
generating a sub-collection of a group of documents within a non-relational database by partition of the non-relational database, the sub-collection including a document of the group, the sub-collection having a sub-collection identifier (ID) including a plurality of identifiers;
receiving a query to access the document of the group, the query including a partition key and a plurality of query fields containing the plurality of identifiers, respectively;
identifying the sub-collection using the plurality of identifiers contained in the plurality of query fields, respectively; and providing access to the document from the identified sub-collection of the non-relational database using the partition key.

8. The method of claim 7 wherein the document has a format that includes at least a first document field, and wherein the method further comprises:
inserting the partition key into the first document field.

9. The method of claim 8 wherein the format of the document further includes at least one second document field, and wherein the method further comprises:
inserting the sub-collection ID into the at least one second document field.

10. The method of claim 9 further comprising:
obtaining the partition key from the first document field.

11. The method of claim 10 further comprising:
obtaining the sub-collection ID from the at least one second document field.

12. The method of claim 7 wherein the identifying of the sub-collection includes obtaining the plurality of identifiers from the plurality of query fields, respectively, the plurality of identifiers including two or more of a first identifier for a deployment of an application under development, a second identifier for a microservice of the deployment, and a third identifier for a database object type associated with the document.

13. A system comprising:
a database server including processing circuitry and a data storage resource, the data storage resource containing a non-relational database,
wherein the processing circuitry is configured to:
generate a sub-collection of a group of documents within the non-relational database, the sub-collection including a document from the group, the sub-collection having a sub-collection identifier (ID) including a plurality of identifiers;
receive a query to access the document, the query including a plurality of query fields containing the plurality of identifiers, respectively;
identify the sub-collection using the plurality of identifiers contained in the plurality of query fields, respectively; and
provide access to the document of the group within the non-relational database in response to identification of the sub-collection.

14. The system of claim 13 wherein the document has a format that includes a plurality of document fields, and wherein the processing circuitry is further configured to insert the plurality of identifiers into the plurality of document fields, respectively.

15. The system of claim 14 wherein the processing circuitry is further configured to provide access to the plurality of identifiers from the plurality of document fields, respectively.

16. The system of claim 13 wherein the processing circuitry is further configured to create the group of documents as a single partition entity of the non-relational database.

17. The system of claim 16 wherein the processing circuitry is further configured to create the sub-collection of the group within the single partition entity of the non-relational database.

* * * * *